Feb. 24, 1959   J. R. STANFORD   2,874,405
APPARATUS AND METHOD OF MANUFACTURING TIRE
Filed Feb. 13, 1958   2 Sheets-Sheet 1

INVENTOR.
JAMES R. STANFORD
BY
W. G. Fraser
ATTY.

Feb. 24, 1959 J. R. STANFORD 2,874,405
APPARATUS AND METHOD OF MANUFACTURING TIRE
Filed Feb. 13, 1958 2 Sheets-Sheet 2

INVENTOR.
JAMES R. STANFORD
BY
ATTY.

United States Patent Office 2,874,405
Patented Feb. 24, 1959

2,874,405

APPARATUS AND METHOD OF MANUFACTURING TIRE

James Raymond Stanford, Cuyahoga Falls, Ohio, assignor to The Firestone Tire & Rubber Company, Akron, Ohio, a corporation of Ohio Application February 13, 1958, Serial No. 715,003

2 Claims. (Cl. 18—2)

This invention relates to the manufacture of pneumatic tires and more particularly to an apparatus and method of inserting a curing bag or diaphragm into a tire for a vulcanizing operation.

Pneumatic tires are conventionally assembled on a building drum so that in their unvulcanized form they are cylindrical in shape. The tires are then molded by collapsing them axially while simultaneously expanding them radially by fluid pressure until the tire takes the desired toroidal form. The final shaping of the tire is performed by forcing the tire in its toroidal shape against the molding surfaces of a suitable vulcanizing mold. Such unvulcanized tires are manufactured in large numbers in vulcanizing presses in which the tire is shaped by means of a diaphragm which transmits the fluid shaping pressure to the tire. The diaphragm, like the unvulcanized tire, is initially cylindrical in form and is positioned concentric with and inside the tire at the beginning of the molding operation. As such vulcanizing presses are closed, fluid, such as hot water, air, or steam is introduced into the diaphragm to force it radially outwardly against the tire and at the same time the tire is compressed axially. As this axial compression of the tire occurs, the ends of the diaphragm are drawn together axially so that the diaphragm and tire together assume the required toroidal shapes. Throughout the shaping and vulcanizing operation, the tire and the diaphragm act together with the tire inflated by the diaphragm and with the diaphragm effectively confined by the tire. After vulcanization is complete, the press is opened and the diaphragm is withdrawn from the tire and is restored to its initially cylindrical state ready for the next vulcanizing operation.

However, there are two circumstances in which such vulcanizing diaphragms and vulcanizing presses cannot be conveniently employed. For example, it is occasionally necessary to subject a cured tire to a so-called re-vulcanizing operation in order to effect a repair or to complete the vulcanization of the tire. Such a tire will necessarily be in its final vulcanized toroidal form, but if it is re-vulcanized in a conventional press, the curing diaphragm will initially be in its cylindrical form. In such a case, it is difficult, if not impossible, to utilize a curing diaphragm because in the initial stages of the shaping operation, the cylindrical diaphragm will project through and beyond the tire and its upper cylindrical portion will be deprived of the confining effect of the tire which would otherwise be present with a conventional unvulcanized tire of cylindrical shape.

Yet another circumstances in which such vulcanizing presses cannot be conveniently employed occurs in the manufacture of certain wire tires which are characterized by inextensible tread ply constructions. In such cases, it is necessary to build the unvulcanized tire in substantially toroidal form and, as in the case of the re-vulcanizing operation described above, it is difficult, if not impossible, to use a cylindrical diaphragm to shape and mold such wire tires.

The present invention solves this general problem of molding tires having initially toroidal form in conventional curing presses by providing auxiliary means which acts in conjunction with the toroidal tire to confine the curing diaphragm and to cause it to inflate directly into the interior of the toroidal tire until it is completely inflated into and confined within the tire. At the end of the inflating step, the auxiliary means can be readily withdrawn, the press can be closed and the molding operation will then proceed as in the conventional manner.

Essentially this auxiliary means comprises a rigid cylindrical member having an inner diameter slightly larger than the diameter of the diaphragm in its initially cylindrical form so that the rigid member can be telescoped over the diaphragm in close supporting contact therewith. The cylindrical supporting member is adapted to rest by its own weight upon the upper bead of the toroidal tire and completely confine that portion of the cylindrical diaphragm which initially extends beyond the upper bead of the toroidal tire when the press is open.

When fluid under pressure is introduced within the diaphragm, the diaphragm will be confined by the auxiliary member and by the tire at every point except between the beads of the tire and the diaphragm will accordingly bulge into the tire. As the inflation of the diaphragm proceeds and as the end plates which clamp the ends of the diaphragm are drawn axially together, the diaphragm will be drawn out of the supporting member and will be progressively inflated into the tire until at the moment the end plates of the diaphragm are in their fully closed position, the diaphragm will be completely free of the cylindrical support and fully inflated into the tire. From this point the auxiliary member can be withdrawn, the press can be closed and the vulcanizing can proceed normally.

The invention is easy and economical to use; it is effective and sure in operation; it can be readily used with present vulcanizing presses without modifying the construction of the presses; no particular skill is needed on the part of the operator; it enables a press to be used with intermixed cylindrical and toroidal unvulcanized tires.

These and other advantages and objects will be more fully apparent from the following description of a preferred form of the invention, reference being had to the accompanying drawings in which.

Figure 2:
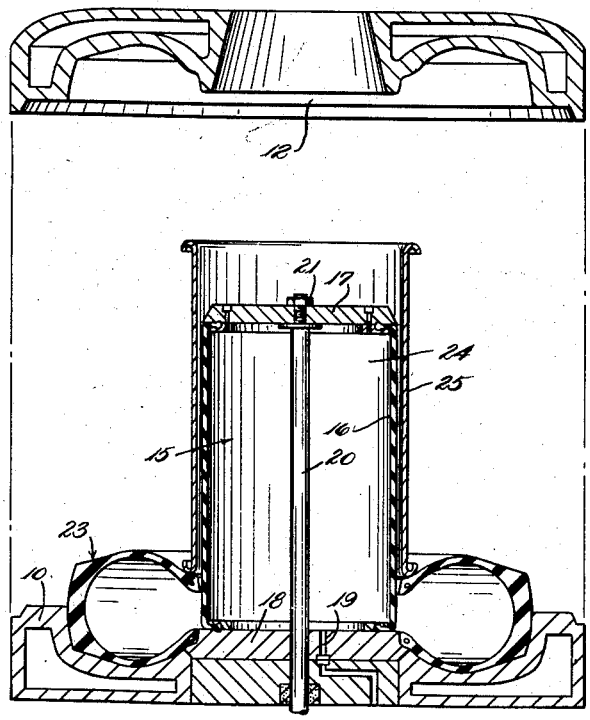
Figure 2 is a view on an enlarged scale showing the portion of Figure 1 which includes the lower mold section, the unvulcanized tire, the curing diaphragm and the auxiliary cylindrical member.
Figure 3:
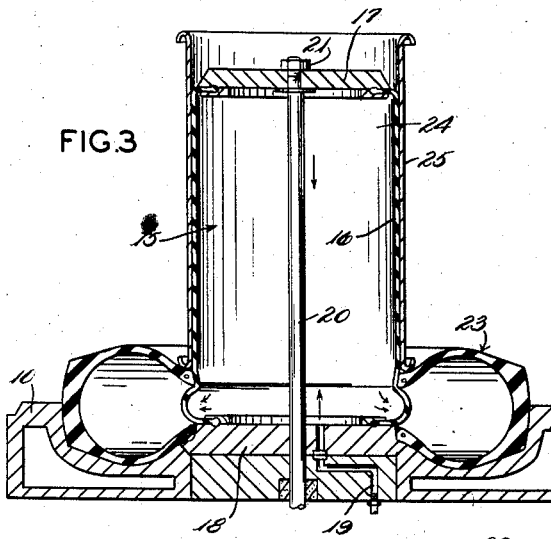
Figure 4:
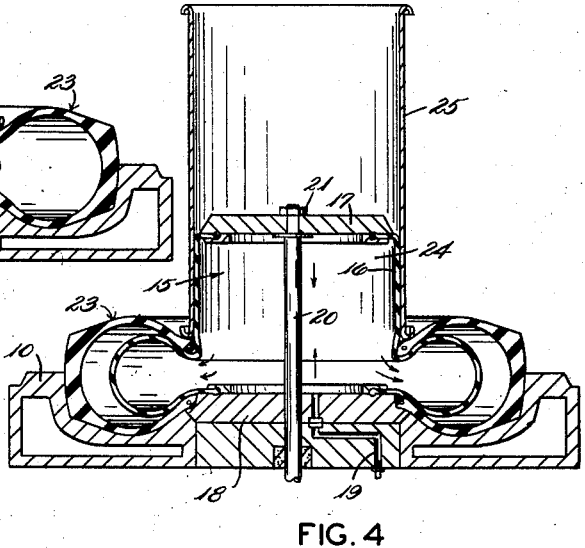
Figure 5:
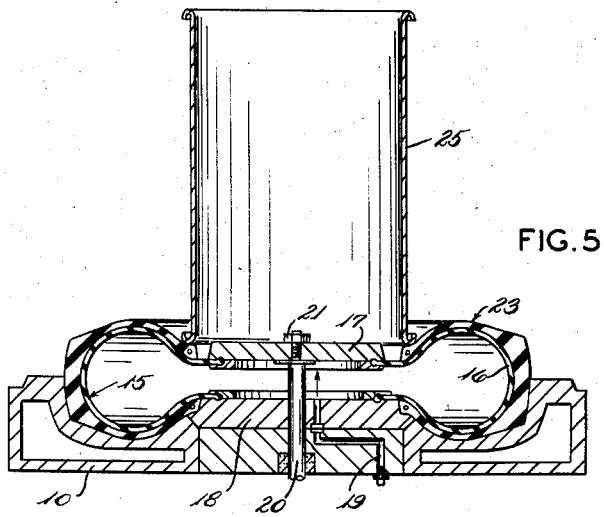
Figure 6:
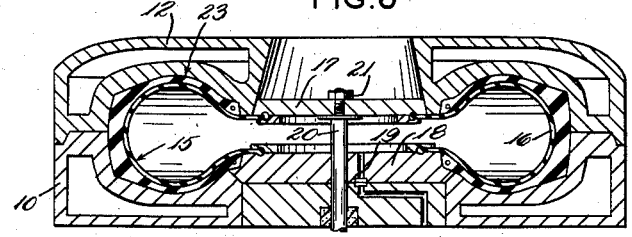

Figures 3-5 are views on the same scale as Figure 2 showing the progressive inflation of the diaphragm into the tire; Figure 3 showing the position just at the beginning of the inflation; Figure 4 showing an intermediate step and Figure 5 showing the final step, and Figure 6 shows the mold closed after the auxiliary member has been removed.

As mentioned above, the invention is especially useful in a vulcanizing press of the automatic type which utilizes an inflatable diaphragm to shape the "green" tire and to force it against the vulcanizing mold. Such a press, as shown diagrammatically in Figure 1, comprises a lower mold section 10 supported by the base 11 of the press and an upper mold section 12 which is supported by the platen 13 of the press. The platen is moved by a suitable mechanism, which need not be described, to carry the upper mold section into and out of contact with the lower mold section in the closing and opening movements of the press.

Figure 1:
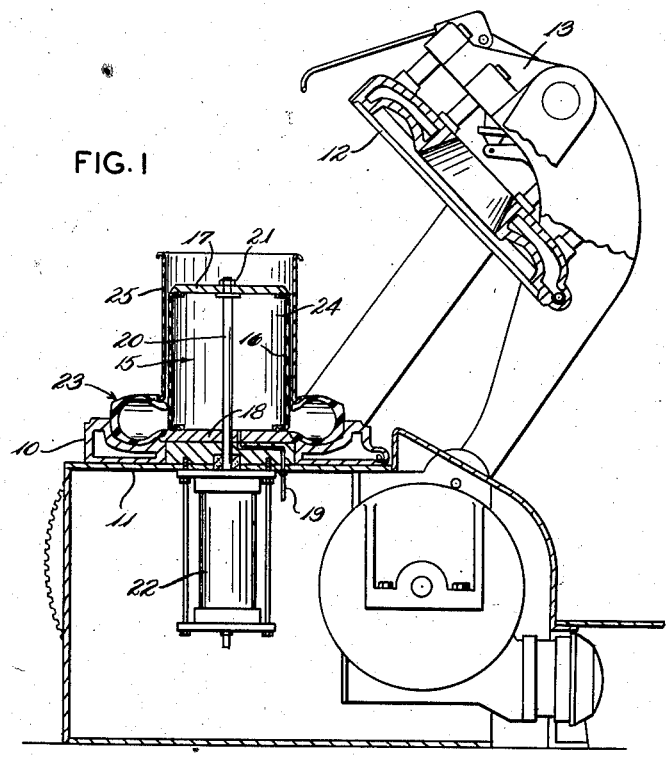
Figure 1 is somewhat a diagrammatic view, in vertical section, of a conventional vulcanizing press showing the press in open position with the unvulcanized tire in place and with the auxiliary cylindrical member, which embodies the present invention, telescoped over the portion of the cylindrical curing diaphragm which projects above the tire.

In such a press, the inflatable diaphragm, indicated generally at 15, comprises a rubber cylinder 16 whose ends are secured respectively to an upper plate 17 and a lower plate 18 by conventional means to form a fluid-tight enclosure. When the press is in open position, as shown in Figure 1, the lower plate 18 is located adjacent the lower mold section 10, and the diaphragm extends upwardly in cylindrical form through the lower mold section with the upper plate 17 positioned vertically above the mold section, as shown.

In the normal operation of the press, the upper mold section 12 is brought vertically downwardly to bear against an unvulcanized, conventionally cylindrical, tire to compress it axially. As this takes place, an inflating fluid such as air or steam under a pressure of about 25 pounds per square inch, is introduced into the diaphragm through the conduit 19 to inflate it radially against the cylindrical tire. As the tire is compressd axially between the mold sections and as the fluid in the diaphragm causes the diaphragm and the tire to bulge radially outwardly, the upper plate 17 of the diaphragm is likewise engaged by the mold section 12 and the diaphragm is also compressed in the axial direction. This simultaneous axial compression and radial expansion of the diaphragm and tire cause them finally to assume a toroidal shape which enables the mold sections to close about and confine the tire.

At the end of the vulcanizing operation, the press is opened by lifting mold section 12 up and away from the lower section 10 and the diaphragm is stripped from the tire by relieving the fluid pressure within the diaphragm and raising the upper plate 17 to restore the diaphragm to its initially cylindrical shape. The vulcanized tire will of course retain its vulcanized, toroidal shape. The upper plate 17 of the diaphragm is preferably raised by a piston and cylinder arrangement comprising a piston rod 20 extending up through the lower plate 18 and fastened, as shown, to the upper plate 17 by nuts 21. The rod 20 is moved by a piston (not shown) which reciprocates within the cylinder 22.

As thus far described, the construction of the vulcanizing press is conventional and need not be described in further detail.

Such a press, however, cannot be successfully operated to vulcanize a tire having an initially toroidal form such as the tire 23, because of the difficulty of inserting the cylindrical diaphragm 15 within the tire. This is because the upper portion 24 of the cylindrical diaphragm adjacent plate 17 which initially projects unconfined and unsupported above the tire, will immediately bulge outwardly under the first surge of fluid pressure and the diaphragm will never enter the tire. The present invention obviates this difficulty by providing a temporary confining support for this upper portion in the form of a cylindrical member 25 which is adapted to fit over the diaphragm 15 in a close telescoping manner so as to prevent the diaphragm portion 24 from expanding radially under the force of the fluid pressure.

The member 25 may be of metal, or of plastic or of any other suitable material which has the strength to resist the expanding force of the diaphragm. Its diameter is only slightly larger, about 1–2 inches larger, than that of the diaphragm and it is adapted to rest upon the upper bead of the unvulcanized tire 23, see particularly Figure 2. It can be readily placed in this position over the diaphragm at the beginning of the vulcanizing operation.

The use of the support member 25 requires only one slight change in the operation of the press and that is to alter the controls so as to draw the diaphragm plates 17 and 18 together by means of the piston rod 20 instead of allowing the platen and upper mold section to force them together. Thus, while the press is still open, fluid under pressure is introduced into the diaphragm. Since the diaphragm is confined at every point by the support member 25, except between the tire beads, it will tend to bulge into the tire, as shown in Figure 3. As fluid continues to flow into the diaphragm, the upper plate 17 is pulled down by the piston rod 20 in timed relation to the flow of fluid and the diaphragm continues to bulge into the tire, see Figure 4.

Finally, by the time the diaphragm is virtually completely inflated into the tire, the diaphragm will be free of support 25, as shown in Figure 5, and the support may be manually removed from the press. The platen 13 may then be lowered to close the mold, as shown in Figure 6, and the vulcanization of the tire can then proceed.

In order to enable the diaphragm to move freely out of the support member 25 as the diaphragm inflates into the tire, it is desirable to lubricate the inside surface of the member 25 and the outside surface of the diaphragm with a suitable lubricant such as one of the silicone compounds that are commercially available for such purpose. This minimizes the friction between the diaphragm and support member and minimizes any tendency of the diaphragm to hang up in the member because of the otherwise high frictional contact between the two surfaces. If difficulty is encountered in getting the diaphragm properly inflated into the tire, the inflating fluid may be introduced intermittently into the diaphragms in spurts with short intervals of zero fluid pressure between the spurts to enable the diaphragm to work gradually into the tire and adjust itself within the tire. Just as the press is finally closed, after the support member 25 is removed, the fluid pressure may again momentarily be dropped to zero.

The supporting member 25 has the advantages of simplicity of structure and function and effectiveness of operation.

Various modifications will no doubt occur to those skilled in the art without departing from the scope of the invention, the essential features of which are included in the following claims.

I claim:
1. The method of inserting a curing diaphragm, initially cylindrical in form, into an unvulcanized tire of toroidal shape which comprises positioning the tire in telescoped position over said diaphragm with the lower bead of said tire adjacent the lower end of said diaphragm, with the lower body portion of the diaphragm spanning the open space between the tire beads and with the upper body portion of said diaphragm projecting upward and beyond said tire for a substantial distance, applying fluid pressure within said diaphragm and temporarily supporting said projecting upper body portion of said diaphragm against the forces of said fluid pressure while causing the upper end of said diaphragm to move toward said tire and causing said diaphragm to inflate progressively between said beads into said tire.

2. In combination a tire vulcanizing press, including lower and upper mold sections mounted respectively on the bed and platen of said press, an inflatable diaphragm normally cylindrical in shape and concentric with and projecting upward through said lower mold section and through and beyond an unvulcanized toroidal tire placed in said lower mold section and a removable cylindrical support having a telescoping fit with the said diaphragm throughout the portion of said diaphragm projecting beyond said tire to give radial support thereto.

References Cited in the file of this patent

UNITED STATES PATENTS

| | | |
|---|---|---|
| 2,255,646 | Brewer et al. | Sept. 9, 1941 |
| 2,730,763 | Brundage | Jan. 17, 1956 |
| 2,741,799 | Heston | Apr. 17, 1956 |
| 2,808,618 | Soderquist | Oct. 8, 1957 |